United States Patent
Kim et al.

(10) Patent No.: US 12,433,760 B2
(45) Date of Patent: Oct. 7, 2025

(54) VARIABLE VERTEBRAL CAGE

(71) Applicant: ENDAC CO., LTD., Gyeonggi-do (KR)

(72) Inventors: Kyung Hak Kim, Gyeonggi-do (KR); Gil Sam Lee, Gyeonggi-do (KR)

(73) Assignee: Endac co., Ltd, Gyeonggi-do (KR)

( * ) Notice: Subject to any disclaimer, the term of this patent is extended or adjusted under 35 U.S.C. 154(b) by 462 days.

(21) Appl. No.: 17/754,684

(22) PCT Filed: Sep. 1, 2020

(86) PCT No.: PCT/KR2020/011697
§ 371 (c)(1),
(2) Date: Apr. 8, 2022

(87) PCT Pub. No.: WO2021/071091
PCT Pub. Date: Apr. 15, 2021

(65) Prior Publication Data
US 2022/0409392 A1 Dec. 29, 2022

(30) Foreign Application Priority Data
Oct. 11, 2019 (KR) .................. 10-2019-0126388

(51) Int. Cl.
*A61F 2/44* (2006.01)
*A61B 17/70* (2006.01)
(Continued)

(52) U.S. Cl.
CPC ........ *A61F 2/4455* (2013.01); *A61B 17/7094* (2013.01); *A61F 2/30767* (2013.01);
(Continued)

(58) Field of Classification Search
CPC .............................. A61F 2/4455; A61F 2/447
See application file for complete search history.

(56) References Cited

U.S. PATENT DOCUMENTS

| | | | |
|---|---|---|---|
| 6,176,882 B1 * | 1/2001 | Biedermann | ........... A61F 2/447 623/17.11 |
| 7,563,284 B2 | 7/2009 | Coppes et al. | |

(Continued)

FOREIGN PATENT DOCUMENTS

| | | | |
|---|---|---|---|
| JP | 2006-514558 A | 5/2006 | |
| JP | 2010-522609 A | 7/2010 | |

(Continued)

OTHER PUBLICATIONS

International Search Report for corresponding International Application No. PCT/KR2020/011697 mailed Dec. 7, 2020.
(Continued)

*Primary Examiner* — Ellen C Hammond
(74) *Attorney, Agent, or Firm* — Harris Kim

(57) ABSTRACT

Proposed is a vertebral cage including a body which is inserted between a vertebra and a neighboring vertebra, and is provided with a space part that can be filled with bone powder; a blade which is rotatably provided on an inner side surface of the body. The cage also includes a locking means which fixes the blade, which has or has not been rotated on the body, on the inner side surface of the body, wherein the locking means comprises fixing protrusions and groove parts which are provided on mutually facing surfaces of the body and the blade, and coupled to each other.

14 Claims, 5 Drawing Sheets

(51) Int. Cl.
*A61F 2/30* (2006.01)
*A61F 2/28* (2006.01)

(52) U.S. Cl.
CPC .......... *A61F 2002/2835* (2013.01); *A61F 2002/30579* (2013.01); *A61F 2002/30904* (2013.01)

(56) References Cited

U.S. PATENT DOCUMENTS

| | | | |
|---|---|---|---|
| 7,563,286 B2 | 7/2009 | Gerber et al. | |
| 8,070,813 B2 | 12/2011 | Grotz et al. | |
| 8,435,301 B2 | 5/2013 | Gerber et al. | |
| 8,480,741 B2 | 7/2013 | Grotz et al. | |
| 9,668,876 B2 | 6/2017 | Blain et al. | |
| 10,034,765 B2 | 7/2018 | Blain et al. | |
| 10,646,351 B2 | 5/2020 | Blain et al. | |
| 11,857,432 B2* | 1/2024 | Keller | A61F 2/447 |
| 2003/0065396 A1* | 4/2003 | Michelson | A61F 2/447 623/17.11 |
| 2005/0197702 A1 | 9/2005 | Coppes et al. | |
| 2005/0251260 A1 | 11/2005 | Gerber et al. | |
| 2007/0233254 A1 | 10/2007 | Grotz et al. | |
| 2008/0161933 A1 | 7/2008 | Grotz et al. | |
| 2009/0270992 A1 | 10/2009 | Gerber et al. | |
| 2012/0016480 A1 | 1/2012 | Gerber et al. | |
| 2012/0116518 A1 | 5/2012 | Grotz et al. | |
| 2013/0231747 A1* | 9/2013 | Olmos | A61F 2/4611 623/17.16 |
| 2014/0039565 A1* | 2/2014 | Martineau | A61B 17/864 606/304 |
| 2015/0190242 A1 | 7/2015 | Blain et al. | |
| 2015/0374507 A1* | 12/2015 | Wolters | A61B 17/8858 623/17.15 |
| 2017/0224504 A1* | 8/2017 | Butler | A61F 2/447 |
| 2017/0224505 A1* | 8/2017 | Butler | A61F 2/44 |
| 2017/0258605 A1 | 9/2017 | Blain et al. | |
| 2018/0193164 A1* | 7/2018 | Shoshtaev | A61F 2/4455 |
| 2018/0333273 A1 | 11/2018 | Blain et al. | |
| 2019/0240039 A1* | 8/2019 | Walker | A61F 2/447 |
| 2020/0129307 A1* | 4/2020 | Hunziker | A61F 2/447 |
| 2020/0276028 A1 | 9/2020 | Blain et al. | |
| 2021/0045892 A1* | 2/2021 | Rogers | A61F 2/4455 |
| 2021/0137699 A1* | 5/2021 | Jang | A61F 2/4455 |
| 2022/0331122 A1* | 10/2022 | Jones | A61F 2/4455 |
| 2022/0409392 A1* | 12/2022 | Kim | A61B 17/7094 |
| 2023/0157840 A1* | 5/2023 | Shin | A61F 2/4455 |
| 2023/0277329 A1* | 9/2023 | Walsh | A61F 2/447 623/17.16 |

FOREIGN PATENT DOCUMENTS

| | | |
|---|---|---|
| JP | 2016-538953 A | 12/2016 |
| KR | 10-1876541 B1 | 7/2018 |
| KR | 06463759 | 1/2019 |
| KR | 10-2106024 B1 | 4/2020 |
| WO | 2015085111 A1 | 11/2015 |

OTHER PUBLICATIONS

Written Opinion for corresponding International Application No. PCT/KR2020/011697 dated Dec. 7, 2020.

* cited by examiner

[FIG. 1]
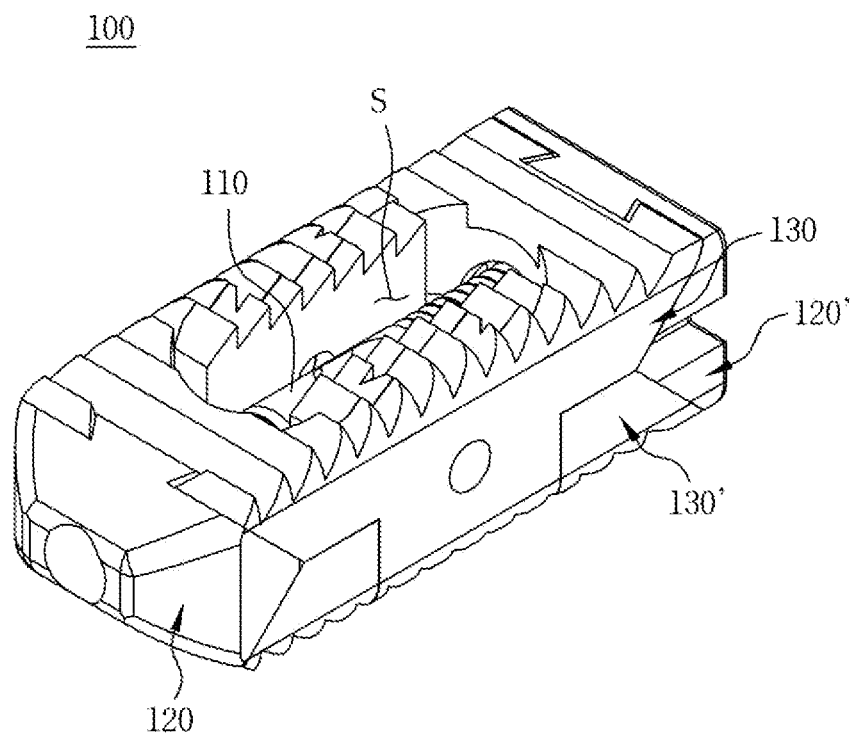

[FIG. 2]
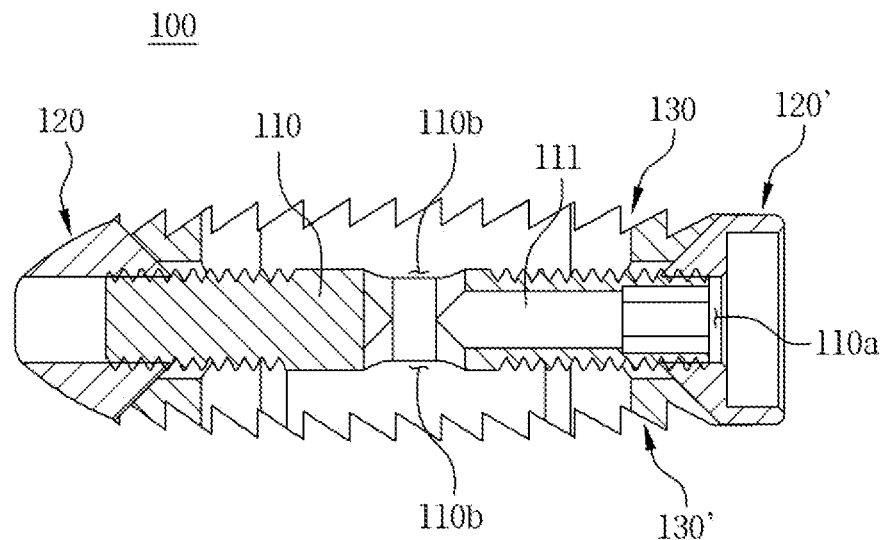
[FIG. 3]
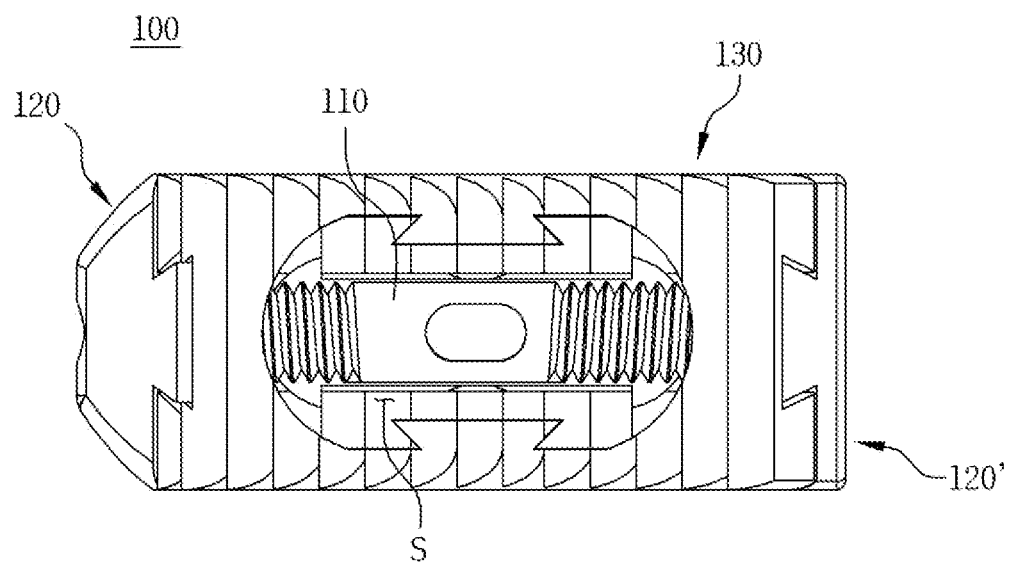

[FIG. 4]
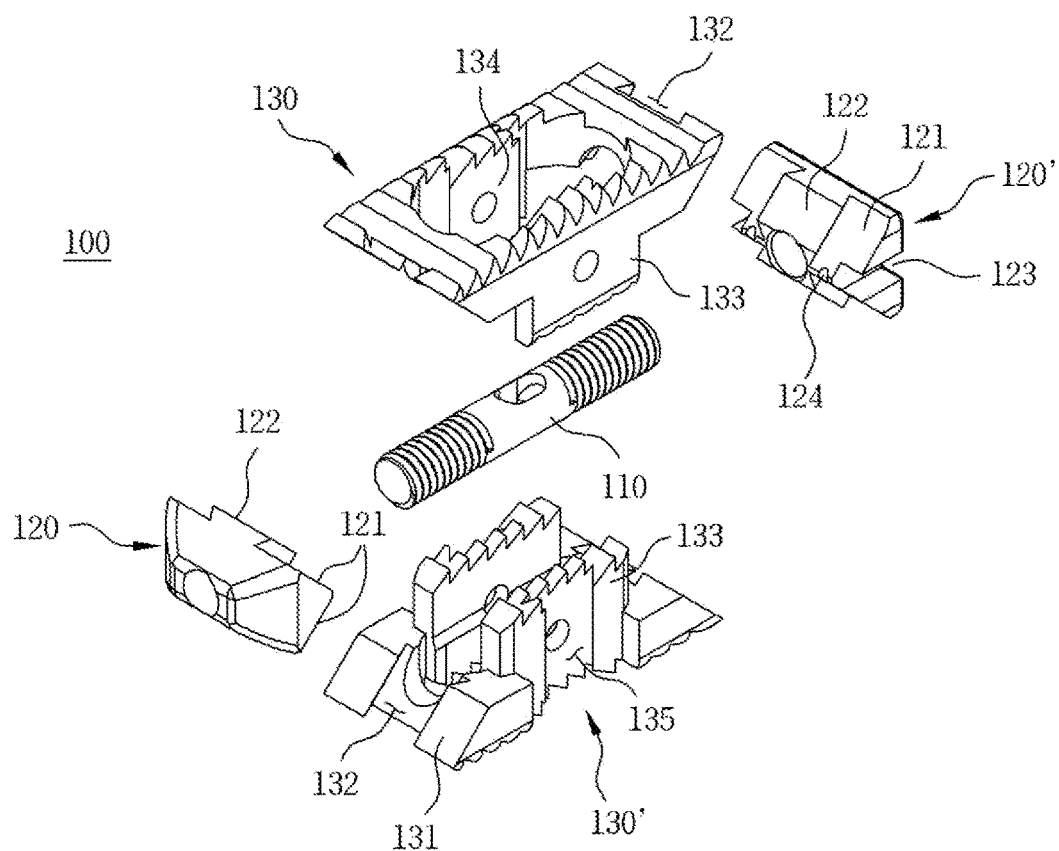

[FIG. 5]
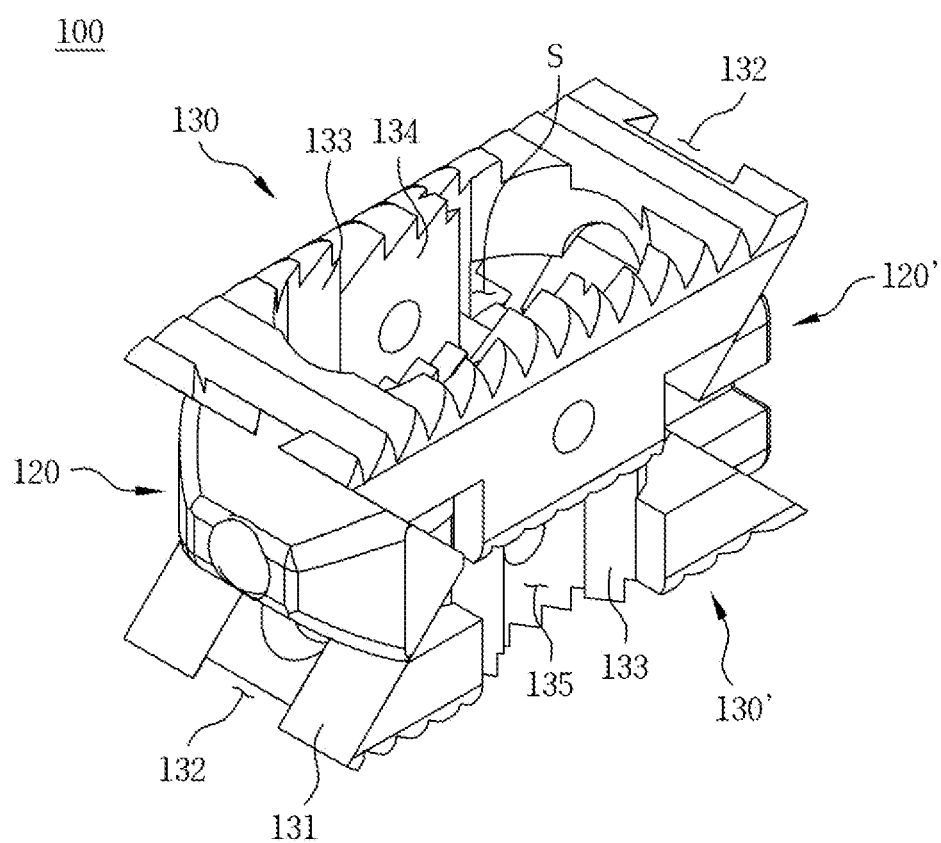

[FIG. 6]
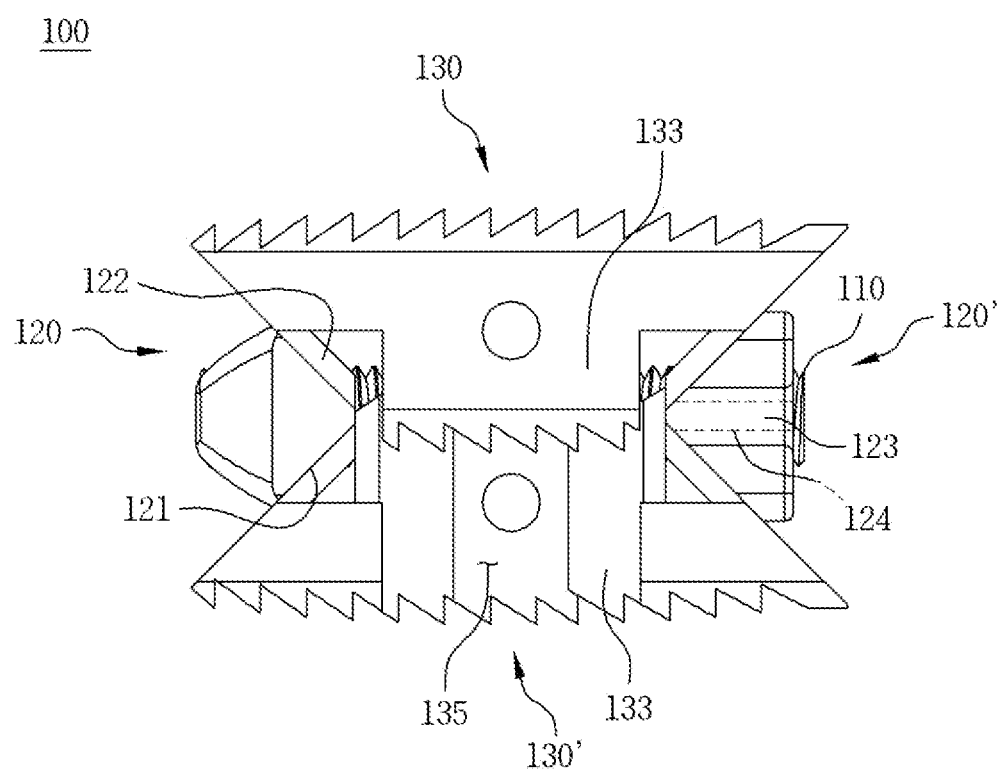

VARIABLE VERTEBRAL CAGE

CROSS-REFERENCE TO RELATED APPLICATIONS

This is a National Stage application of PCT international application PCT/KR2020/011697 filed on Sep. 1, 2020, which claims the priority of Korean Patent Application No. 10-2019-0126388 filed Oct. 11, 2019, which are incorporated herein by reference in their entireties.

TECHNICAL FIELD

The present disclosure relates to a cage inserted into a space between adjacent vertebrae to prevent subsidence and fuse the adjacent vertebrae and, more particularly, to a variable vertebral cage configured to be expanded in a top-bottom direction after having been inserted into a vertebral spine so as to be filled with bone-regenerative materials (e.g., bone powder).

BACKGROUND ART

In general, a disc lying between adjacent vertebrae serves as a joint. Since the position and shape of the nucleus pulpous contained inside the disc change in response to the movement of the spine, the disc performs a key role to minimize the impact applied to the spine.

The majority of the nucleus pulpous is comprised of moisture (i.e., water). As a person ages, the amount of moisture of the nucleus pulpous gradually decreases, and thus the disc loses the shock absorbing function.

Thus, when an excessive amount of pressure is applied to fibers, lumber pain occurs. When this situation progresses further, the fibers may be severely stretched or ruptured to press the nerve root positioned behind, thereby causing pain in the pelvis, legs, and the like.

Afterward, a variety of adverse reactions may occur. For example, the vertebrae spacing may be gradually decreased, or the vertebra may sink, thereby resulting in spinal deformity.

As an example of treatment for diseases occurring in relation to the disc, there is a method of removing a damaged disc from between adjacent vertebrae and replacing the space between adjacent vertebrae with a prosthetic material, namely, a cage. That is, the cage is configured to recover the spacing between the two adjacent vertebrae, which is the original height of the disc between the adjacent vertebrae, so that the function of the spinal body may be recovered.

The vertebral cage may be a medical device configured to maintain the height between two adjacent vertebrae, i.e., adjacent upper and lower vertebrae, after the damaged disc is removed from the two adjacent vertebrae and provide bone-regenerative materials (e.g., bone powder) for fusing the two vertebrae.

The vertebral cage of the related art may include a body having a space that may be filled with bone-regenerative materials (i.e., bone powder) and configured to be inserted into a space between adjacent vertebrae.

However, only a portion of the vertebral cage of the related art is in contact with the vertebrae in the vertebral spine. Thus, the vertebral cage of the related art may fail to substantially perform the function of a disc, which is problematic.

In order to overcome this problem, a surgical method of inserting a plurality of cages into the vertebral spine is used. However, to the contrary, this method is disadvantageous in terms of an increased operation time and a complicated operation process, which increase the burden on patients.

In addition, in order to overcome this problem, a method of fabricating a body of a cage to have the same size as a disc to be replaced, and inserting the cage into the vertebral spine has been used. However, this method has problems in that the size of an incised portion through which the cage is inserted is increased and various types of bodies matching the disc sizes of patients need to be fabricated.

Accordingly, recently, a variable cage configured such that the body thereof is variable in the height direction and the transverse direction to be in close contact to vertebrae adjacent to each other has been developed and used. As a related art of this variable cage, there is Korean Patent No. 10-1876541, titled "VARIABLE IMPLANT FOR VERTEBRAL INTERVALS", filed by the inventors of this application.

Since the variable cage according to the related art has the structure in which the body inserted into the vertebral spine may be expanded in the height direction and the transverse direction, there is an advantage that the close contact force of the body to the vertebral spine may be increased so that the vertebral body may be reliably supported.

However, in the variable cage according to the related art, since the coupling force between movable blocks of the body is reduced while the respective movable blocks are being expanded, the respective movable blocks of the body become loose and are separated from each other, which is a problem. That is, each of the plurality of movable blocks is moved in a top-bottom direction or a transverse direction with respect to a rotating rod having threads. In this process, the coupling force between the movable blocks may be gradually reduced, and thus the movable blocks may not be moved in a straight direction or be separated from each other so as not to be in close contact with the vertebrae.

In addition, the variable cage according to the related art is configured to be inserted into the vertebral spine and then is expanded after a storage space formed in the body is filled with bone-regenerative materials (i.e., bone powder). Thus, since the bone powder storage space is also expanded during the movement of the plurality of movable blocks, the bone-regenerative material (i.e., bone powder) filling the unexpanded storage space does not contact the vertebrae, thereby disadvantageously reducing the effect of the fusion of the vertebrae.

The present applicant proposed the present disclosure in order solve the above-described problems, and as a related art document, there is Korean Patent No. 10-1876541, titled "VARIABLE IMPLANT FOR VERTEBRAL INTERVALS".

DISCLOSURE

Technical Problem

Accordingly, the present disclosure has been made to address the above problems occurring in the related art, and one of the objectives of the present disclosure is to provide a variable vertebral cage configured to be inserted into the vertebral spine and configured such that the inside of an expanded body of the variable vertebral cage is filled with a bone-regenerative material.

Another objective of the present disclosure is to provide a variable vertebral cage configured such that, when the body thereof is varied and expanded, the coupling force between respective movable blocks may be maintained to increase the close contact force to the vertebrae.

Technical Solution

In order to accomplish the above objectives, the present disclosure provides a variable vertebral cage including: a shaft having threads on longitudinal end portions thereof; wedge blocks provided on one and the other ends of the shaft, respectively, and configured to be moved toward and away from each other by rotation of the shaft; and movable blocks configured to be coupled to at least one wedge block of the wedge blocks to define a variable space to be filled with bone powder, and provided above and below the at least one wedge block, respectively, to be moved by the movement of the at least one wedge block. The shaft may include a bone powder guide connected to the variable space, the bone powder guide allowing the bone powder to be inputted to the variable space from an external source.

In addition, the bone powder guide may include a flow path connected to the variable space.

In addition, the flow path may extend from one longitudinal end to a longitudinally intermediate portion of the shaft.

In addition, one longitudinal end of the flow path may be connected to a bone powder inlet formed in one longitudinal end of the shaft. The other longitudinal end of the flow path may be connected to bone powder outlets formed in a longitudinally intermediate portion of the shaft.

In addition, the bone powder inlet may have a shape matching a leading end of a surgical instrument for rotating the shaft.

In addition, the plurality of bone powder outlets may be provided in a circumferential direction of the shaft while being spaced apart from each other.

In addition, each of the wedge blocks may include: a wedge surface configured to be in contact with one longitudinal end of each of the movable blocks; and a coupling protrusion provided on the wedge surface.

In addition, the wedge block provided on one end of the shaft may include a grasp recess configured to be grasped by the surgical instrument.

In addition, each of the movable blocks may include: inclined surfaces configured to be in surface contact with the wedge surfaces of the wedge blocks; coupling recesses provided on the inclined surfaces and configured such that the coupling protrusions of the wedge blocks are inserted into the coupling recesses in a sliding movable manner; and vertical walls arranged on both sides of the shaft.

In addition, the vertical walls provided on the pair of movable blocks may move in relation to each other while being coupled to each other by a guide means. The guide means may include guide protrusions and guide recesses formed on facing surface portions of the vertical walls provided on the pair of movable blocks and configured to be coupled with each other.

In addition, when the pair of wedge blocks are moved toward each other, one vertical wall of the vertical walls provided on each of the pair of movable blocks may be in contact with the wedge blocks to limit a distance by which the wedge blocks are moved.

In addition, the coupling protrusion and the coupling recesses may be provided in a shape of dovetails so as to be joined to each other by a dovetail joint.

In addition, provided is a variable vertebral cage including: a shaft having threads on both longitudinal end portions thereof; wedge blocks provided on one and the other ends of the shaft, respectively, and configured to be moved toward and away from each other by rotation of the shaft; and movable blocks configured to be coupled to at least one wedge block of the wedge blocks to define a variable space to be filled with bone powder, and provided above and below the at least one wedge block, respectively, to be moved by the movement of the at least one wedge block. One wedge block of the wedge blocks may include a bone powder guide hole connected to the variable space, the bone powder guide hole allowing the bone powder to be inputted to the variable space from an external source through the bone powder guide hole.

In addition, the bone powder guide hole may be provided in the wedge block of the pair of wedge blocks grasped by a surgical instrument.

Advantageous Effects

As described above, the variable vertebral cage according to the present disclosure is configured such that the bone powder can be inputted into the variable space that is expanded to a volume greater than the volume of the variable space initially inserted into the vertebral spine as the movable blocks move upward and downward to be in close contact with the vertebrae in the vertebral spine. Thus, the entire volume defined by the variable space can be filled with the bone powder, thereby allowing the bone powder to be in close contact with the vertebrae.

In addition, in the variable vertebral cage according to the present disclosure, the bone powder filled in the variable space can prevent a gap between the wedge blocks and the movable blocks, and thus the vertebral body can be firmly supported.

Furthermore, the variable vertebral cage according to the present disclosure is configured such that a surgeon inputs the bone powder for being fused with the vertebrae after the wedge blocks and the movable blocks are moved predetermined distances in the vertebral spine. Thus, it is possible to prevent the complicated process of filling the variable space with the bone powder before surgery. It is also possible to prevent a problem in that the wedge blocks and the movable blocks are not moved predetermined distances due to the bone powder interfering with the rotation of the shaft.

In addition, the variable vertebral cage according to the present disclosure can increase the coupling force between the wedge blocks moving in the longitudinal direction of the shaft and the movable blocks moving in the height direction of the shaft in response to the rotation of the shaft, thereby preventing the wedge blocks from being separated in the vertebral spine.

DESCRIPTION OF DRAWINGS

FIG. 1 is a perspective view illustrating a variable vertebral cage according to an embodiment of the present disclosure;

FIG. 2 is a side cross-sectional view of the variable vertebral cage illustrated in FIG. 1;

FIG. 3 is a plan view of the variable vertebral cage illustrated in FIG. 1;

FIG. 4 is an exploded perspective view of the variable vertebral cage according to an embodiment of the present disclosure;

FIG. 5 is a perspective view illustrating an expanded position of the variable vertebral cage according to an embodiment of the present disclosure; and FIG. 6 is a side view of the variable vertebral cage illustrated in FIG. 5.

MODE FOR INVENTION

The above and other advantages and features of the present disclosure, as well as methods of realizing the same, will be more clearly understood from the following detailed description of embodiments when taken in conjunction with the accompanying drawings.

However, the present disclosure is not limited to specific embodiments to be described hereinafter but may be embodied in a variety of different forms. Rather, these embodiments are provided so that the description of the present disclosure will be complete and will fully convey the scope of the present disclosure to those skilled in the technical field to which the present disclosure pertains. The present disclosure shall be defined by the scope of the Claims.

Hereinafter, a variable vertebral cage according to embodiments of the present disclosure will be described in detail with reference to FIGS. 1 to 6. In the following description of the present disclosure, a detailed description of known technology or the like will be omitted in the situation in which the subject matter of the present disclosure may be rendered rather unclear thereby.

FIG. 1 is a perspective view illustrating a variable vertebral cage according to an embodiment of the present disclosure, FIG. 2 is a side cross-sectional view of the variable vertebral cage illustrated in FIG. 1, FIG. 3 is a plan view of the variable vertebral cage illustrated in FIG. 1, FIG. 4 is an exploded perspective view of the variable vertebral cage according to an embodiment of the present disclosure, FIG. 5 is a perspective view illustrating an expanded position of the variable vertebral cage according to an embodiment of the present disclosure, and FIG. 6 is a side view of the variable vertebral cage illustrated in FIG. 5.

As illustrated in FIGS. 1 to 6, a variable vertebral cage 100 may include: a shaft 110 having threads on both longitudinal end portions thereof; wedge blocks 120 and 120' provided on one and the other ends of the shaft 110, respectively, and configured to be moved toward and away from each other by rotation of the shaft 110; and movable blocks 130 and 130' configured to be coupled to the wedge block 120 to define a variable space S to be filled with bone powder, and provided above and below the wedge block 120, respectively, to be moved by the movement of the wedge block 120.

First, the variable vertebral cage 100 having the above-described configuration is configured to be inserted into a space between adjacent vertebrae and to be expanded by the manipulation of a surgeon, and also has a structure by which the variable space S to be filled with bone powder is expanded at the same time.

Thus, the variable vertebral cage 100 according to the present disclosure may be characterized in that a bone powder guide allowing the variable space S expanded in the vertebral spine to be filled with bone powder by the surgeon is provided on the shaft 110. Hereinafter, the wedge blocks 120 and 120' and the movable blocks 130 and 130' will be described first.

The wedge blocks 120 and 120' may be fastened with threads formed on one and the other ends of the shaft 110. In this regard, the wedge blocks 120 and 120' are provided with through-holes through which one and the other ends of the shaft 110 may extend. The wedge blocks 120 and 120' have threads formed on the inner circumferential surface of the through-holes to be engaged with the threads formed on the shaft 110.

In addition, the wedge block 120 provided on the other end of the shaft 110, of the pair of wedge blocks 120 and 120' provided on the shaft 110, may be a component configured to be preferentially inserted into the body. In contrast, the wedge block 120' provided on one end of the shaft 110 may be a component configured to be grasped by a surgical instrument. Thus, the wedge block 120' provided on one end of the shaft 110 may be provided with a grasp recess 123 configured to be grasped by the surgical instrument.

For reference, the threads formed on the shaft 110 may be machined on one and the other ends of the shaft 110 in opposite directions such that the pair of wedge blocks 120 and 120' may be moved toward or away from each other by the rotation of the shaft 110 in one direction or the other direction.

As illustrated in FIGS. 4 to 6, each of the above-described wedge blocks 120 and 120' may include: a wedge surface 121 configured to be in contact with one longitudinal end of each of the movable blocks 130 and 130'; and a coupling protrusion 122 provided on the wedge surface 121.

As illustrated in FIGS. 4 to 6, each of the movable blocks 130 and 130' may include: inclined surfaces 131 configured to be in surface contact with the wedge surfaces 121 of the wedge blocks 120 and 120'; coupling recesses 132 provided on the inclined surfaces 131 and configured such that the coupling protrusions 122 of the wedge blocks 120 and 120' are inserted into the coupling recesses 132 in a sliding movable manner; and vertical walls 133 arranged on both sides of the shaft 110.

The movable blocks 130 and 130' work in concert with the pair of wedge blocks 120 and 120' to define the variable space S to be filled with bone powder. In addition, the central portions of the movable blocks 130 and 130' have an open shape by which the bone powder filled in the variable space S may be in contact with the vertebrae.

When the pair of wedge blocks 120 and 120' are moved toward each other by the rotation of the shaft 110 in one direction, the movable blocks 130 and 130' having the above-described configuration may be pressed by the wedge surfaces 121 of the wedge blocks 120 and 120' so as to be moved upward and downward, respectively. Here, the movable block 130 disposed above the wedge blocks 120 and 120' may be in close contact with the bottom surface of the upper vertebra, whereas the movable block 130' disposed below the wedge blocks 120 and 120' may be in close contact with the top surface of the lower vertebra.

Here, the vertical walls 133 provided on the pair of movable blocks 130 and 130' may move in relation to each other while being coupled to each other by a guide means.

For reference, the guide means may include guide protrusions 134 and guide recesses 135 formed on facing surface portions of the vertical walls provided on the pair of movable blocks 130 and 130' and configured to be coupled with each other. In an embodiment of the present disclosure, the guide protrusions 134 are illustrated in the figures as being provided on the vertical walls 133 of the upper movable block 130 of the pair of movable blocks 130 and 130', whereas the guide recesses 135 are illustrated in the figures as being provided on the vertical walls 133 of the remaining lower movable block 130' of the pair of movable blocks 130 and 130'.

In addition, when the pair of wedge blocks 120 and 120' are moved toward each other, one vertical wall 133 of the vertical walls 133 provided on each of the pair of movable blocks 130 and 130' may be in contact with the wedge blocks 120 and 120' to limit a movement distance of the wedge blocks 120 and 120', i.e., a distance by which the wedge blocks 120 and 120' are moved. That is, as illustrated in FIG. 6, the pair of wedge blocks 120 and 120' may be moved toward each other before the movements of the of wedge blocks 120 and 120' are limited through contact with the longitudinal ends of the vertical walls 133. For reference, in an embodiment of the present disclosure, the pair of movable blocks 130 and 130' are illustrated in the figures that the movement distance of the wedge blocks 120 and 120' is limited by setting the length of the vertical walls 133 of the lower movable block 130' to be greater than the length of the vertical walls 133 of the upper movable block 130.

In the meantime, the coupling protrusion 122 and the coupling recess 132 may be provided in the shape of dovetails so as to be joined to each other by a dovetail joint. That is, it is possible to increase the coupling force between the wedge blocks 120 and 120' and the movable blocks 130 and 130' by fabricating each of the coupling protrusion 122 and the coupling recesses 132 in the shape of a pole plate with a fist-shaped head. In the same manner, the guide protrusions 134 and the guide recesses 135 formed on the vertical walls 133 of the movable blocks 130 and 130' may also be provided in the shape of dovetails so as to be joined to each other by a dovetail joint. According to this configuration, even in the case that the wedge blocks 120 and 120' and the movable blocks 130 and 130' are moved by the rotation of the shaft 110, the coupling force between the wedge blocks 120 and 120' and the movable blocks 130 and 130' may be maintained. Consequently, the wedge blocks 120 and 120' and the movable blocks 130 and 130' may be prevented from being separated from the vertebral spine and moved in predetermined directions.

As illustrated in FIGS. 5 and 6, when the movable blocks 130 and 130' are moved upward and downward in response to the wedge blocks 120 and 120' being moved toward each other, the variable space S is in an expanded position. Thus, it may be more desirable to fill the expanded variable space S with the bone powder rather than filling the unexpanded variable space S with the bone powder.

Thus, the shaft 110 may be provided with the bone powder guide for allowing the bone powder to be inputted to the expanded variable space S from an external source.

For reference, the bone powder refers to a bone-regenerative element, such as bone chips of, for example, artificial bone or autogenous bone, or bone cement.

As illustrated in FIG. 2, the bone powder guide may be implemented as a flow path 111 connected to the variable space S.

The flow path 111 allows the bone powder inputted from the external source to move to the variable space S through the flow path 111. In an embodiment of the present disclosure, the flow path 111 is illustrated in the figures as extending from one longitudinal end to a longitudinally intermediate portion of the shaft 110.

One longitudinal end of the flow path 111 may be connected to a bone powder inlet 110a formed in one longitudinal end of the shaft 110, whereas the other longitudinal end of the flow path 111 may be connected to bone powder outlets 110b formed in a longitudinally intermediate portion of the shaft 110.

Here, as illustrated in FIG. 2, the bone powder inlet 110a may be provided in a shape matching the leading end of the surgical instrument for rotating the shaft 110. For example, when the leading end of the surgical instrument has a hexagonal cross-sectional shape, the bone powder inlet 110a may also have a hexagonal cross-sectional shape.

In addition, a plurality of bone powder outlets 110b may be provided in the circumferential direction of the shaft 110 while being spaced apart from each other. In an embodiment of the present disclosure, two bone powder outlets 110b are illustrated in the figure as being provided on intermediate portions of the shaft 110.

The bone powder guide having the above-described configuration allows the surgeon to easily fill the volume-expanded variable space S with the bone powder. That is, in a situation in which a tube or a catheter is connected to the bone powder inlet 110a formed on one longitudinal end of the shaft 110, when the bone powder is input, the bone powder may sequentially pass through the flow path 111 and the bone powder outlets 110b and then be discharged to the variable space S.

Then, the variable space S may be filled with the bone powder, and the bone powder may be exposed through open areas formed in the movable blocks 130 and 130' to be in contact with the vertebrae in an airtight manner.

In the meantime, the variable vertebral cage 100 according to an embodiment of the present disclosure may further include a bone powder guide hole 124 provided in the wedge block 120' of the pair of wedge blocks 120 and 120'.

As illustrated in FIGS. 4 and 6, the bone powder guide hole 124 is provided on the wedge block 120' which is the last member to be grasped using the surgical instrument and inserted into the vertebral body.

The bone powder guide hole 124 is formed on the wedge block 120' so as to communicate with the variable space S. The bone powder guide hole 124 may be formed at a position not interfering with the grasp recess 123 or a shaft insertion hole.

When the variable space S is expanded in response to the movement of the pair of wedge blocks 120 and 120' and the pair of movable blocks 130 and 130', the bone powder guide hole 124 allows the surgeon to input the bone powder into the expanded variable space S through the bone powder guide hole 124.

That is, the wedge block 120' configured to be grasped by the surgeon is grasped using the surgical instrument and maintains a stable position while the variable space S is being expanded. In particular, since the wedge block 120' is the last member to be inserted into the vertebral spine, the wedge block 120' may be regarded as a component to transfer the additional bone powder to the expanded variable space S. Thus, since the wedge block 120' described above is provided with the bone powder guide hole 124 through which the bone powder may flow, the surgeon may easily input the bone powder into the expanded variable space S.

Due to the bone powder guide hole 124 described above, the surgeon may easily fill the expanded variable space S with the bone powder without providing the above-described bone powder guide on the shaft 110. Desirably, the bone powder guide hole 124 may be used together with the bone powder guide provided on the shaft 110, thereby allowing the bone powder to be uniformly inputted to the entire volume formed by the variable space S. For example, when bone powder in the form of a viscous liquid is used, it is possible to uniformly fill the entirety of the expanded variable space S with the bone powder by inputting the bone powder only through the bone powder guide hole 124.

However, when the bone powder in the form of powder is used, when the bone powder is inputted only through the powder guide hole 124, the bone powder may be deposited only on one side of the variable space S, and thus the entirety of the variable space S is not uniformly filled with the bone powder. Accordingly, in such a situation, the bone powder guide provided on the shaft 110 may be used together to uniformly input the bone powder in the form of powder to the entirety of the variable space S.

Although the specific embodiments of the present disclosure have been described, various changes in forms may be made without departing from the scope of the present disclosure.

For example, in an embodiment of the present disclosure, the flow path 111 is described and illustrated in the specification and figures as extending from one longitudinal end to a longitudinally intermediate portion of the shaft 110, but is not limited thereto. That is, the flow path 111 may extend along the entire length of the shaft 110, or along a variety of lengths of the shaft 110 to match the sizes of the variable space S.

In the same manner, the number or positions of the bone powder outlets 110b through which the bone powder is discharged may vary to match the sizes of the variable space S.

Accordingly, the scope of the present disclosure shall not be defined by the described embodiments but will be defined by the appended Claims and equivalents thereof.

INDUSTRIAL APPLICABILITY

The present disclosure may be used in the medical industry field.

The invention claimed is:

1. A variable vertebral cage comprising:
a shaft having two thread portions threaded in opposite directions on both sides and a non-threaded portion in a middle between the two thread portions on a longitudinal surface thereof;
two wedge blocks provided on one end and the other end of the shaft, respectively, and configured to be moved toward and away from each other by rotation of the shaft; and
movable blocks configured to be coupled to at least one wedge block of the two wedge blocks to define a variable space to be filled with bone powder, and provided above and below the at least one wedge block, respectively, to be moved by a movement of the at least one wedge block,
wherein the shaft comprises
a bone powder guide connected to the variable space, the bone powder guide allowing the bone powder to be inputted to the variable space from an external source, and
a bone powder outlet disposed on the non-threaded portion in the middle between the two thread portions, wherein the bone powder is discharged into the variable space through the bone powder outlet,
wherein each of the two wedge blocks comprises:
a wedge surface configured to be in contact with one longitudinal end of each of the movable blocks; and
a coupling protrusion provided on the wedge surface.

2. The variable vertebral cage of claim 1, wherein the bone powder guide comprises a flow path connected to the variable space.

3. The variable vertebral cage of claim 2, wherein the flow path extends from one longitudinal end to a longitudinally intermediate portion of the shaft.

4. The variable vertebral cage of claim 3, wherein one longitudinal end of the flow path is connected to a bone powder inlet formed in one longitudinal end of the shaft, and the other longitudinal end of the flow path is connected to a plurality of bone powder outlets formed in a longitudinally intermediate portion of the shaft.

5. The variable vertebral cage of claim 4, wherein the bone powder inlet has a shape matching a leading end of a surgical instrument for rotating the shaft.

6. The variable vertebral cage of claim 5, wherein one of the two wedge blocks provided on one end of the shaft comprises a grasp recess configured to be grasped by the surgical instrument.

7. The variable vertebral cage of claim 4, wherein the plurality of bone powder outlets are provided in a circumferential direction of the shaft while being spaced apart from each other.

8. The variable vertebral cage of claim 1, wherein each of the movable blocks comprises:
inclined surfaces configured to be in surface contact with the wedge surfaces of the two wedge blocks;
coupling recesses provided on the inclined surfaces and configured such that the coupling protrusions of the two wedge blocks are inserted into the coupling recesses in a sliding movable manner; and
vertical walls arranged on both sides of the shaft.

9. The variable vertebral cage of claim 8, wherein the vertical walls provided on a pair of movable blocks are movable in relation to each other while being coupled to each other by a guide means,
wherein the guide means comprises guide protrusions and guide recesses formed on facing surface portions of the vertical walls provided on the pair of movable blocks and configured to be coupled with each other.

10. The variable vertebral cage of claim 9, wherein when the two wedge blocks are moved toward each other, one vertical wall of the vertical walls provided on each of the pair of movable blocks is in contact with each wedge block to limit a distance by which the wedge blocks are moved.

11. The variable vertebral cage of claim 8, wherein the coupling protrusion and the coupling recesses are provided in a shape of dovetails so as to be joined to each other by a dovetail joint.

12. The variable vertebral cage of claim 1, wherein
the two thread portions include a first thread portion to be engaged with one of the two wedge blocks, and a second thread portion to be engaged with the other of the two wedge blocks, and
the first and second thread portions have opposite thread directions each other such that the two wedge blocks are moved toward or away from each other by rotations of the shaft in one direction or the other direction.

13. A variable vertebral cage comprising:
a shaft having two thread portions threaded in opposite directions on both sides and a non-threaded portion in a middle between the two thread portions on a longitudinal surface thereof;
two wedge blocks provided on one and the other ends of the shaft, respectively, and configured to be moved toward and away from each other by rotation of the shaft; and
movable blocks configured to be coupled to at least one wedge block of the two wedge blocks to define a variable space to be filled with bone powder, and one movable block provided above and the other movable block below the at least one wedge block, respectively, to be moved by a movement of the at least one wedge block,
wherein one wedge block of the two wedge blocks comprises a bone powder guide hole connected to the variable space, the bone powder guide hole allowing the bone powder to be inputted to the variable space from an external source through the bone powder guide hole, the shaft comprises a bone powder outlet disposed on the non-threaded portion in the middle between the two thread portions, wherein the bone powder is discharged into the variable space through the bone powder outlet, wherein each of the two wedge blocks comprises:

a wedge surface configured to be in contact with one longitudinal end of each of the movable blocks; and a coupling protrusion provided on the wedge surface.

14. The variable vertebral cage of claim 13, wherein the bone powder guide hole is provided in one of the two wedge blocks grasped by a surgical instrument.

* * * * *